(12) United States Patent
Endo et al.

(10) Patent No.: US 7,590,458 B2
(45) Date of Patent: Sep. 15, 2009

(54) CONVERSATIONAL NUMERICAL CONTROL APPARATUS

(75) Inventors: Takahiko Endo, Kokubunji (JP); Katsuhiro Endou, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 605 days.

(21) Appl. No.: 11/360,388

(22) Filed: Feb. 24, 2006

(65) Prior Publication Data

US 2006/0208681 A1 Sep. 21, 2006

(30) Foreign Application Priority Data

Feb. 25, 2005 (JP) .............................. 2005-051335

(51) Int. Cl.
*G05B 13/02* (2006.01)
*G06F 15/18* (2006.01)
(52) U.S. Cl. .......................................... 700/47; 706/12
(58) Field of Classification Search ............. 700/47–50; 706/12–16, 25
See application file for complete search history.

(56) References Cited

U.S. PATENT DOCUMENTS

| | | | | |
|---|---|---|---|---|
| 4,823,253 A * | 4/1989 | Shima et al. ................... 700/86 |
| 5,029,068 A * | 7/1991 | Miyata et al. ................... 700/86 |
| 5,239,477 A * | 8/1993 | Matsumura et al. ......... 700/180 |
| 5,291,416 A * | 3/1994 | Hutchins ..................... 700/174 |
| 5,453,933 A * | 9/1995 | Wright et al. ................ 700/181 |
| 5,808,888 A * | 9/1998 | Susnjara et al. ................ 700/86 |
| 6,022,132 A * | 2/2000 | Schulz ........................ 700/186 |
| 6,202,003 B1 * | 3/2001 | Niwa .......................... 700/192 |
| 6,671,571 B1 * | 12/2003 | Matsumiya et al. .......... 700/172 |
| 6,903,527 B2 * | 6/2005 | Toyozawa et al. ....... 318/568.13 |
| 7,085,620 B2 * | 8/2006 | Maeda et al. ................ 700/193 |
| 7,174,226 B2 * | 2/2007 | Nakazato et al. .............. 700/47 |
| 7,206,659 B2 * | 4/2007 | Hosokawa et al. ........... 700/193 |
| 7,254,461 B2 * | 8/2007 | Hosokawa et al. ........... 700/177 |
| 2005/0251284 A1 * | 11/2005 | Balic .......................... 700/182 |
| 2007/0191982 A1 * | 8/2007 | Sullivan ...................... 700/182 |

FOREIGN PATENT DOCUMENTS

| | | |
|---|---|---|
| JP | 6-309021 | 11/1994 |
| JP | 2005-122647 | 5/2005 |

* cited by examiner

*Primary Examiner*—M. N. Von Buhr
(74) *Attorney, Agent, or Firm*—Staas & Halsey LLP

(57) ABSTRACT

Step data are sequentially read out from a conversational program created in a conversational format. The processor 13 determines whether or not leaning control in the step is possible. When the leaning control is possible, a learning start command is added to the start of the program to create and output an NC program in the step. Also a learning end command is added to the end of the NC program in the step. Conversion into the NC program is performed for each of steps. When a learning control automatic ON/OFF operation is selected to all the steps, a learning control start command and a learning control end command are added to the start and the end of the converted NC program when learning control of all the steps can be performed.

6 Claims, 5 Drawing Sheets

FIG. 3

| EDITING OF MACHINING PROGRAM | | | | | [INTERACTION:HEAD-L] |
|---|---|---|---|---|---|
| NUMBER=1234 | NAME=DEMONSTRATION | | | | |
| INITIAL SETTING | MATERIAL SHAPE<br>PC25  ROD STOCK | OUTER DIAMETER OF MATERIAL<br>100.000 | INNER DIAMETER OF MATERIAL | LENGTH OF MATERIAL<br>145.000 | MAXIMUM ROTATIONAL SPEED   CUTTING OIL<br>2000   ON |
| | | FINISHING ALLOWANCE X<br>0.200 | FINISHING ALLOWANCE Z<br>0.100 | CHAMFERING ALLOWANCE<br>2.000 | PRODUCT LENGTH<br>150.000 |
| STEP(01) | MACHINING AREA | UNIT | MANAGEMENT NUMBER<br>102 | PERIPHERAL SPEED<br>80 | CUTTING FEED   INITIAL CUTTING   T CODE<br>0.25   2.000   0101 |
| ROD STOCK (ROUGH) | OUTER DIAMETER | HEAD-L | | | |
| STEP(01) | MACHINING AREA | UNIT | MANAGEMENT NUMBER<br>102 | PERIPHERAL SPEED<br>80 | CUTTING FEED   T CODE<br>0.25   0101 |
| ROD STOCK (FINISH) | OUTER DIAMETER | HEAD-L | SURFACE ROUGHNESS<br>5▼ | | SR= 5▼ |
| | START POINT<br>□ | X=20.000<br>X=20.000<br>X=30.000 | Z=0.000<br>Z=30.000<br>Z=40.00 | | |

CONTOUR SHAPE (HORIZONTAL LINE)
HORIZONTAL DIRECTION            B=            X=
END POINT Z-COORDINATE          Z= 30.000     Q=
HORIZONTAL LINE X-COORDINATE
LENGTH OF LINE
SURFACE ROUGHNESS                             SR=

| WINDOW OFF | < | INSERTION | CHANGE | CHANGE IN SHAPE | DELETE | | CUTTING CONDITION | TOOL DATA | DETAILED DATA | PRODUCT DRAWING | + |

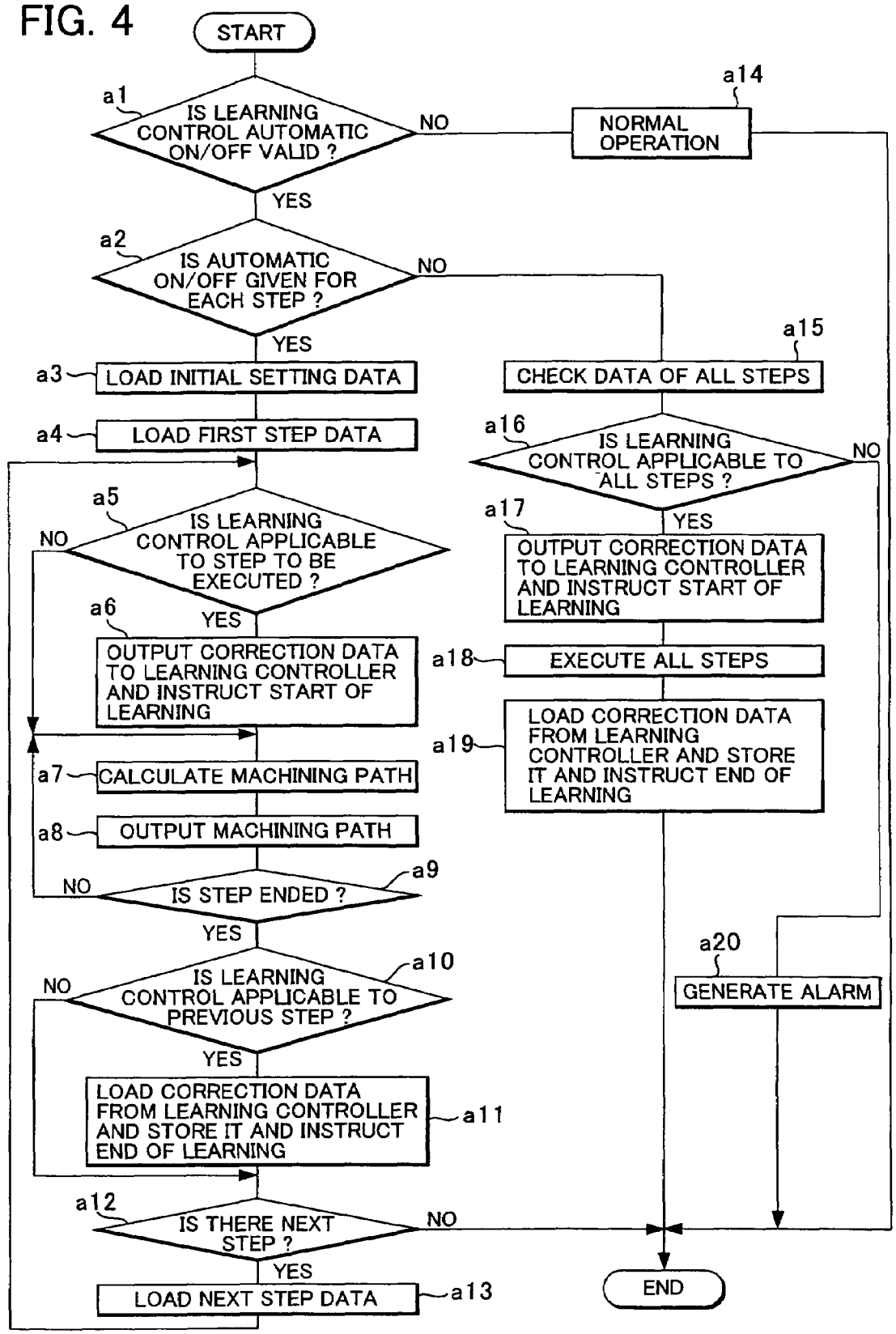

CONVERSATIONAL NUMERICAL CONTROL APPARATUS

BACKGROUND OF THE INVENTION

1. Field of the Invention

The present invention relates to a numerical control apparatus which controls a machine tool or the like, in particular, to a conversational numerical control apparatus which creates a machining program on the basis of data inputted in a conversational format or executes the machining program and which executes learning control.

2. Description of the Related Art

When the same command pattern is repeatedly commanded to execute the same operation pattern to perform machining or the like, learning control is performed to improve machining accuracy. In the learning control, one pattern in which the same command pattern is commanded to generate the same operation pattern is defined as one cycle, a position deviation is sampled, and correction data of one cycle is stored on the basis of the position deviation. The correction data in corresponding sampling in the same command pattern is added to a position deviation in the current sampling to perform correction. The learning control is repeatedly executed to sequentially update correction values, so that the position deviation can be finally converged to about "0". Since the position deviation is converged to about "0", high machining accuracy can be obtained (for example, see Japanese Patent Application Laid-Open No. 6-309021).

The conventional learning control is applied to only a binary operation in which the same operation pattern is generated. In an operation by a normal NC program (EIA format) (command such as an M code is included in a program, and an operation timing is shifted with an influence caused by execution of a process by the command such as the M code when executing an NC program at each stage), the same operation pattern is not generated even though the same NC program is executed. For this reason, learning control is not applicable to NC programs.

A patent application for a numerical control apparatus in which learning control is applicable to a normal NC program (EIA format) is filed at the Japanese Patent Office (Japanese Patent Application Serial No. 2003-359664). In the patent application, in case where the same command pattern is repeatedly executed to perform machining, a learning control ON command and learning command OFF command which commands a learning control start position and a learning control end position are included in a program in advance (or a command indicating feasibility of learning control is set and stored in advance), and learning control is performed based on the determination as to whether the type of the program command is a command indicating feasibility of learning control, which is set and stored in advance, or not.

However, in the numerical control apparatus proposed in the patent application, a creator of a machining program has to input a command code for commanding a learning control start position and learning control end position in the machining program, or a command indicating feasibility of learning control has to be set and stored in advance. For this reason, it is difficult for programmers to create a machining program for execution of a learning control, unless they are so skilled in machining.

SUMMARY OF THE INVENTION

The present invention relates to a conversational numerical control apparatus which creates correction data on the basis of a position deviation in the same operation pattern and stores the correction data, which has a learning control function of correcting a position deviation in execution of the same operation pattern on the basis of the stored correction data, and which inputs a machining shape and a machining condition in a conversational format to create a conversational program.

A first aspect of the conversational numerical control apparatus according to the present invention comprises: a determination unit which determines whether or not learning control can be performed with the created conversational program;

a converting unit which converts the conversational program into an NC program; and a command code inserting unit which respectively inserts a command code for start of learning control and a command code for end of learning control in the start and end positions of the NC program which is converted by the converting unit and for which the determination unit determines that the learning control can be performed.

As an object of the learning control, an entire conversational program can be set.

The determination unit may determine whether or not learning control can be performed for each of machining steps of the conversational program, and the command code inserting unit respectively may insert the learning control start command code and a learning control end command code in a start and an end of the NC program in a machining step for which the determination unit determines that the learning control can be performed, so that an NC program is created.

A second aspect of the conversational numerical control apparatus according to the present invention comprises: a determination unit which determines whether or not learning control can be performed with the created conversational program; a unit which executes the conversational program to output a moving command of a machining path; and a command output unit which outputs a learning control start command and a learning control end command to start and end positions of the conversational program for which the determination unit determines that the learning control can be performed.

As an object of the learning control, an entire conversational program can be set.

The determination unit may determine the created conversational program for each of machining steps, the command output unit may output a learning control start command prior to outputting a moving command of a machining path in a machining step for which the determination unit determines that the learning control can be performed, and output a learning control end command after outputting the moving command of the machining path in the machining step.

Since the present invention has the above configuration, when learning control can be applied to a machining program created in a conversational format, a command can be made such that the learning control can be automatically performed. For this reason, even a beginner can easily create a machining program for execution of learning control.

BRIEF DESCRIPTION OF THE DRAWINGS

The above and other characteristic features of the present invention will be apparent from the following explanation of the embodiments with reference to the accompanying drawings. Of these drawings:

FIG. 3 is a diagram showing an example of a machining program editing screen which create a conversational program in the conversational numerical control apparatus in FIG. 1;

FIG. 4 is a flowchart of a first example in which a machine tool is directly operated by a conversational program created by the conversational numerical control apparatus.

DETAILED DESCRIPTION OF THE PREFERRED EMBODIMENTS

Figure 1:
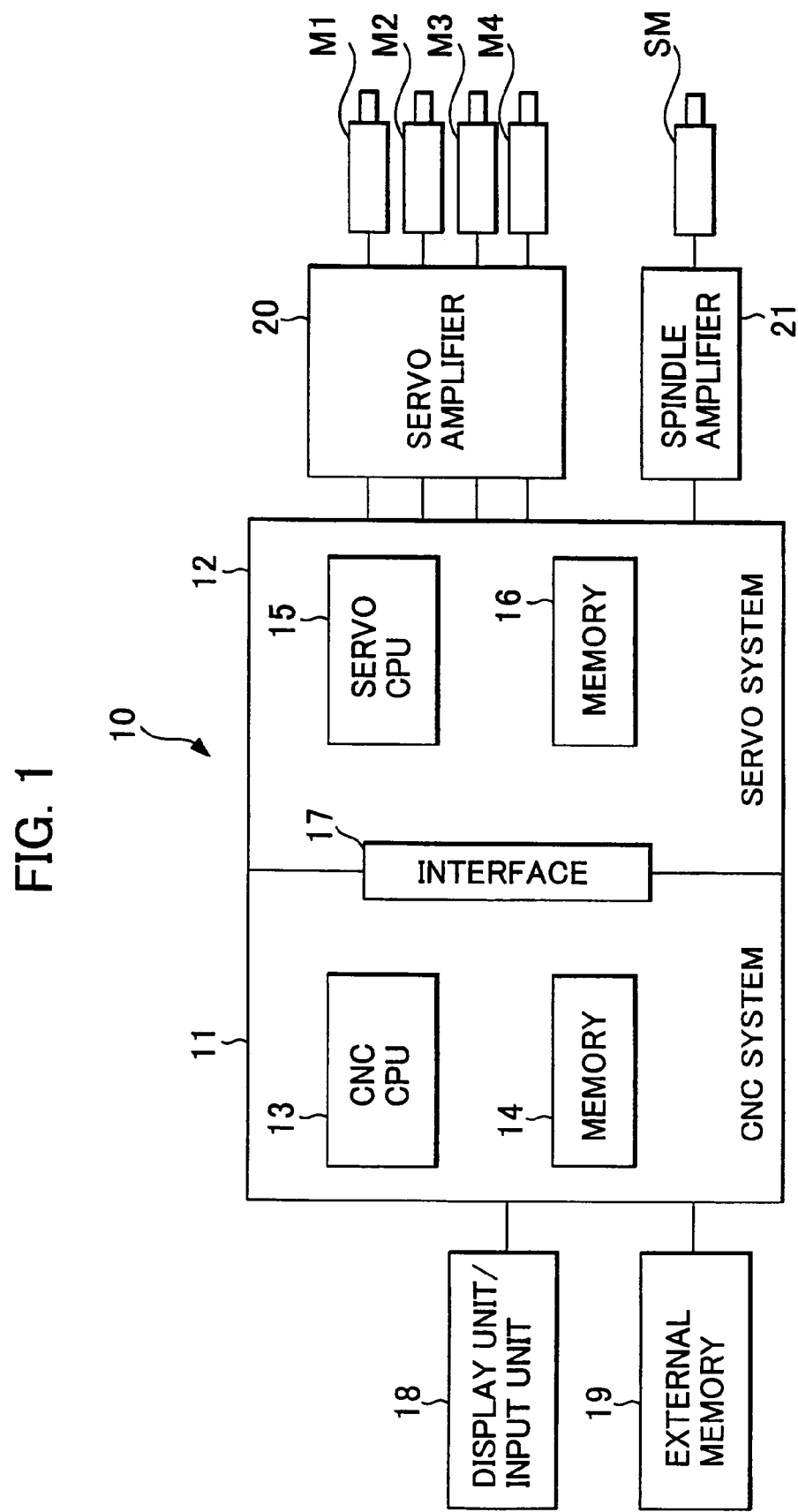
FIG. 1 is a schematic diagram of a conversational numerical control apparatus according to an embodiment of the present invention.

FIG. 1 is a schematic diagram of a conversational numerical control apparatus according to an embodiment of the present invention. The hardware configuration of the conversational numerical control apparatus is the same as that of a conventional conversational numerical control apparatus, so that the hardware configuration is simply shown in FIG. 1. A conversational numerical control apparatus 10 is constituted by a CNC system 11 and a servo system 12. The CNC system 11 and the servo system 12 are connected to each other through an interface 17.

The CNC system 11 includes a numerical control processor 13, a memory 14 constituted by a ROM, a RAM, a nonvolatile RAM, or the like, and a display unit/input unit 18 constituted by a display unit constituted by a CRT or a liquid crystal panel and an in put device such as a keyboard. The CNC system 11 is designed to also be connected to an external memory 19 through an interface.

The servo system 12 includes a servo circuit which controls the positions, velocities, and currents of axial servo motors of a machine tool or the like and a control circuit of a spindle. The servo system 12 has a servo processor 15 and a memory 16 constituted by a ROM, a RAM, or the like. The servo system 12 is connected to axial servo motors M1 to M4 through a servo amplifier 20. A spindle motor SM is also connected to the servo system 12 through a spindle amplifier 21. Servo control which controls the axial servo motors and control of the spindle are performed by software.

The processor 13 in the CNC system 11 stores a machining program in the memory 14 in a conversational format by using the display unit/input unit 18. The processor 13 reads and executes the stored conversational program and performs a distributive interpolating process to the respective axes on the basis of moving commands delivered by respective blocks to give the moving commands for the respective axes to the servo system 12 through the interface 17.

The processor 15 of the servo system 12 performs loop processes of a position, a velocity, and a current on the basis of the moving commands, and feedback signals of a position and a velocity from a position/velocity detector arranged in each servo motor or the like, and a current feedback signal, and drives and controls the axial servo motors M1 to M4 through the servo amplifier 20. Similarly, feedback control of a velocity is also performed to the spindle motor SM, and a spindle speed is held in a conversational program command value. The conversational program created in a conversational format is converted into an NC program and stored in the external memory 19 to make it possible to use the NC program in another numerical control apparatus.

The configuration and operation of the conversational numerical control apparatus 10 described above are the same as those of a conventional numerical control apparatus. Furthermore, in the embodiment, the processor 15 in the servo system 12 also performs a learning control process.

Figure 2:
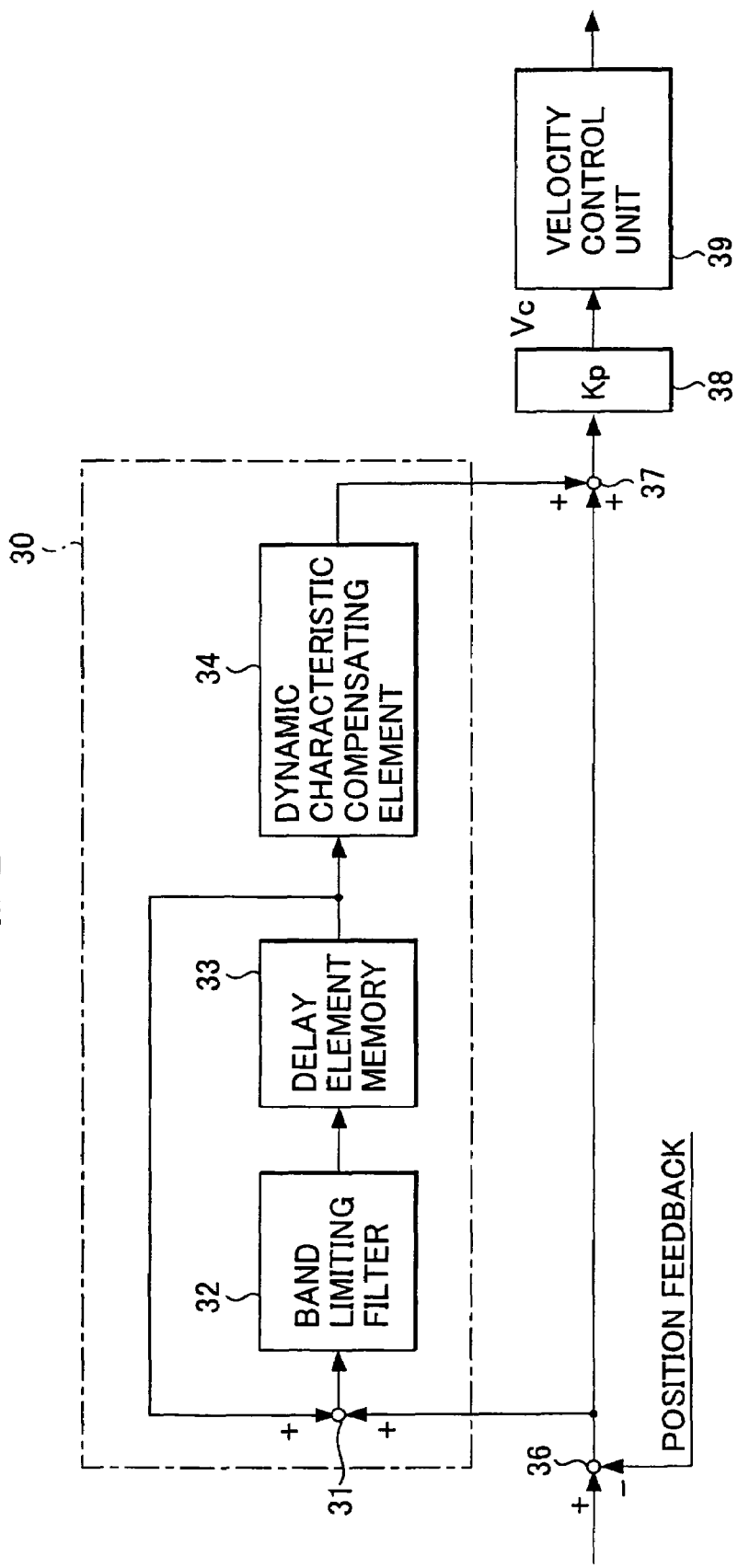
FIG. 2 is a block diagram showing position loop control and learning control in a servo system.

FIG. 2 shows a part of a block diagram of a servo process which controls the respective servo motors M1 to M4 executed by the processor 15 in the servo system 12. In particular, in the embodiment, a learning controller 30 which performs learning control is provided, the process of the learning controller 30 is executed by the processor 15 in the servo system 12. The learning controller 30 is known as a conventional art.

When learning control is not performed, a position feedback amount fed back by the position/velocity detector is subtracted from a position command delivered by the CNC system 11 by a subtractor 36 to obtain a position deviation. The obtained position deviation is multiplied by a position loop gain Kp to calculate a velocity command. The obtained velocity command is delivered to a velocity control unit. In the velocity control unit, on the basis of the velocity command and a velocity feedback amount to be fed back, a process such as proportional plus integral process is performed to obtain a current command. The obtained current command is outputted to the current control unit. In the current control unit, loop control of a current is performed to drive and control the servo motors M1 to M4 through the servo amplifier 20.

A learning controller 30 is constituted by an adder 31, a band limiting filter 32 set for stabilizing a control system, a delay element memory 33 which stores correction data the number of which corresponds to a sampling number of one cycle of the same command pattern, and a dynamic characteristic compensating element 34 which compensates a phase delay of a control object and a decrease in gain.

The learning controller 30 inputs a position deviation calculated for each sampling cycle (position/velocity loop process cycle), reads correction data corresponding to current sampling time in the same command pattern from the delay element memory 33 to perform the process of the dynamic characteristic compensating element 34, and outputs a correction value. The correction value (output from the learning controller 30) is added to the position deviation by an adder 37. Furthermore, the addition result in the adder 37 is multiplied by the position loop gain Kp to obtain a velocity command. The obtained velocity command is inputted to a velocity control unit 39.

On the other hand, the correction data read from the delay element memory 33 at the current sampling time is added to the position deviation by the adder 31. The addition result in the adder 31 is processed by the band limiting filter 32 to obtain correction data. Thereafter, one stored data in the delay element memory 33 is shifted and processed by the band limiting filter 32 to obtain correction data. The correction data thus obtained is stored in a memory which stores the latest data.

In this manner, in learning control, of correction data obtained on the basis of a position deviation at each sampling time in the process of the same command pattern performed previously, correction data corresponding to current sampling time when the same current command pattern is executed is read to correct the position deviation. Furthermore, correction data corresponding to current sampling time when the same next command pattern is executed is stored in the delay element memory to update the correction data. In this manner, the learning control is executed on the assumption that the same operation pattern is generated by the same command pattern.

However, when there is a command for thread cutting, an M code, or the like, an operation timing shifts every time a machining program is executed. As a result, in execution of each machining program, the machining program is not executed in the same operation pattern. In the foregoing Japanese Patent Application (Serial No. 2003-359664), a command code which indicates a learning control start position and a learning control end position is inputted to the machining program, or a command indicating feasibility of learning control is set and stored in advance so that learning control can be performed when the command is loaded.

On the other hand, even though conversational programs are created for each of parts, the conversational numerical control apparatus automatically creates a machining step internally. More specifically, even though the conversational numerical control apparatus creates conversational programs for each of machining steps or creates conversational programs for each of parts, the conversational numerical control apparatus can grasp the machining steps.

Therefore, in the conversational numerical control apparatus, in case where a learning unit in learning control is set to a machining step, a conversational program creator need not give instruction of learning start command and learning end command in learning control by using commands. Thus, the conversational numerical control apparatus can automatically give instructions indicative of learning start command and learning end command to a lower-level controller.

FIG. 3 shows an example of a machining program editing screen on which a conversational program is created in the conversational numerical control apparatus. The conversational program is constituted by an initial setting data and step data. The initial setting data includes the material of a material to be machined, the shape of the material to be machined (rod stock or molding material), the outer diameter of a material (diameter of the internal form of the material), the inner diameter of a material (diameter of the outer form of the material), the length of a material, the maximum rotational speed (maximum rotational speed when peripheral speed is controlled to be constant), cutting oil (designation of cutting oil to be used), finishing allowances in X and Z-axis directions, a chamfering allowance, the length of a product (length of a product upon completion of machining), and the like. These data are set. The step data is constituted by a cutting condition and a cutting shape thereof. These data are inputted and set. For example, a machining type (rod stock, end face, thread cutting, groove, or the like) is designated. In the rod stock, when a machining area is designated, cutting conditions of a rough machining step (management number of a tool to be used, a peripheral speed serving as a cutting speed, cutting feed, an initial cutting amount, and the like) are automatically determined. Cutting conditions in each step such as a finish machining step are designated. The cutting shape is defined by inputting coordinate values or the like according to a guidance displayed on a display screen.

As described above, in the conversational program, the machining step is defined, the cutting conditions are determined for each of machining processes, and the machining steps are sequentially executed. The outer-edge machining, the inner-edge machining, and the like can be performed by learning control. However, thread cutting machining cannot be performed by learning control. Depending on machining types of the machining steps, it is determined whether learning control is possible or not. Therefore, according to the present invention, an entire program or each step is set as a learning control unit to make it possible to automatically turn on or off learning control without defining the start and the end of the learning control in the conversational program.

FIG. 4 is a flowchart of a first example in which a machine tool is directly operated by a conversational program created by the conversational numerical control apparatus 10.

If an operator automatically performs an ON/OFF operation of learning control, the operator turns on an automatic learning control mode and also select any one of execution modes of the automatic learning control from among two modes: one to be executed for each of steps, and the other to be executed for each of parts to be machined wherein learning control is executed throughout the entire program.

When a direct operation command of the conversational program is performed, the processor 13 in the CNC system 11 determines whether or not the conversational program is set in the learning control automatic ON/OFF mode (step a1). When the conversational program is not set in the learning control automatic ON/OFF mode, a normal operation is performed, and the conversational program is executed without performing learning control (step a14).

On the other hand, when the conversational program is set in the learning control automatic ON/OFF mode, the processor 13 determines whether or not learning control ON/OFF operations are executed for each of steps (step a2). When the learning control ON/OFF operations are set to be executed for each of steps, initial setting data of the conversational program is loaded, and the first step data is loaded (steps a3 and a4).

On the basis of the loaded step data, the processor 13 determines whether or not the learning control can be applied to a step executed at the present (step a5). When learning control is applicable to the step, such as machining of an outer edge, an inner edge, or the like, correction data stored in association with the current step is transferred to the learning controller 30 arranged in the servo system 12 serving as a lower-level controller, and a learning start command is further outputted (step a6).

The learning controller 30 sets the received correction data in the delay element memory 33 to make learning control feasible.

A machining path is calculated on the basis of the loaded step data (step a7). The machining path (moving command) is outputted to the servo system 12 (step a8). The processes in steps a7 and a8 are repeatedly executed until the currently loaded steps are ended. On the other hand, if the processor 13 determines in step a5 that learning control is not applicable to the loaded step, as the step is thread cutting machining or the like, then the program skips step a6 to proceed to step a7, and the processes in steps a7 and a8 are repeatedly executed until the steps are ended.

The processor 15 in the servo system 12 performs position, velocity, and current loop processes. When a learning start command is inputted to the processor 15, the processor 15 also executes the process of the learning controller 30 shown in FIG. 2.

On the basis of a machining path (position command) and a position feedback signal sent from the CNC system 11, a position deviation is calculated. When the learning start command is inputted, the learning control described with reference to FIG. 2 is performed in the learning controller 30, and an obtained correction amount (output from the learning controller 30) is added to the position deviation by the adder 37 to correct the position deviation. The corrected position deviation is multiplied by the position gain Kp to calculate a velocity command Vc. Velocity loop control is performed by the calculated velocity command Vc and a velocity feedback signal to calculate a torque command (current command). Current loop control is performed by the calculated torque command (current command) and current feedback to obtain a command to the servo motor, and the servo motor is driven through the servo amplifier 20.

Upon complete of the loaded machining step (step a9), the processor 13 determines whether or not the machining step which has been executed up to now is the step in which learning control has been executed (step a10). When the machining step is the step which executes the learning control, a learning control end command is transmitted to the learning controller 30 serving as a lower-level control to end the learning control process. A correction amount to be stored in the delay element memory 33 of the learning controller 30 is stored in association with the loaded step (step a11). When the previous step is the step in which learning control has not been executed, the process in step a11 is not performed.

The processor 13 determines whether or not there is a next step in the conversational program (step a12). When there is a next step, the next step is read (step a13), and the program returns to step a5 to execute the process in step a5 and subsequent steps. When the final step is executed so that there is no next step, (step a12), the execution of the conversational program is ended.

In this manner, the step data are sequentially loaded, and the processor 13 determines whether or not learning control is applicable to the loaded step. As a result, if determined that learning control is applicable, correction data stored in association with the current step is outputted to a learning controller, and a learning control start command is outputted to a learning controller to cause the learning controller to perform learning control. On the other hand, if determined that learning control is not applicable to the step (as the step is for thread cutting machining or the like) then no learning control start command is outputted, not causing the learning controller to perform learning control.

On the other hand, in step a2, if determined that learning control ON/OFF operations are executed for entire program, instead of each of steps, then data of all steps of the conversational program are read, and the processor 13 determines whether or not learning control is applicable to all the steps (step a15 and a16). As a result, if determined that learning control is not applicable to all the steps, an alarm signal is generated to inform an operator that learning control of all the steps cannot be performed (step a20).

On the other hand, if determined that learning control is applicable to all the steps, then correction data throughout all the steps are outputted to the learning controller 30 serving as the lower-level controller, and a learning control start command is outputted to the learning controller 30 (step a17). All the steps are executed (for example, a machining path is calculate to output a moving command) (step a18). In a servo system of the lower-level controller, position, velocity, and current loop processes are performed while performing learning control to drive the servo motor, and machining in all the steps is performed.

Upon completion of all the steps, a learning end command is outputted to the lower-level controller, and correction data of the learning control is fetched and stored (step a19).

In the learning control, learning control of the same pattern operation is performed, correction of position deviation by correction data and an updating of the correction data are executed a plurality of times. In this way, the position deviation is approximated to zero. At this stage, further updating of the correction data is meaningless, accuracy may be rather deteriorated. For this reason, the learning controller is instructed so as not to perform updating of the correction data any more, after the updating of the correction data and the learning control of an output are performed predetermined times. In this case, when a learning control start command is outputted from the CNC system 11, the correction data is not updated, and learning control in which only correction of a position deviation is performed by the correction data is performed.

Figure 5:
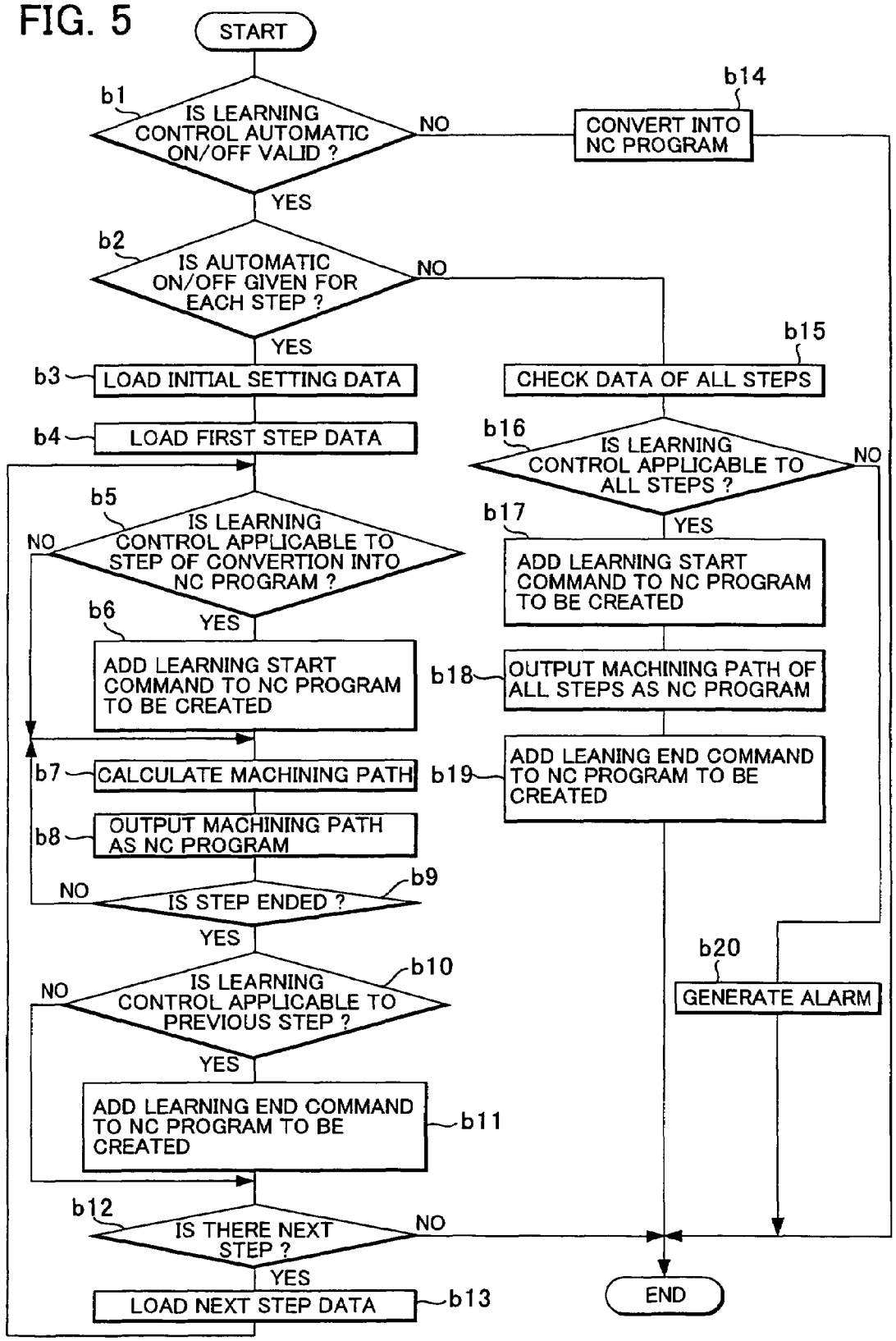
FIG. 5 is a flow chart of a second example in which a machine tool is operated by a conversational program created by the conversational numerical control apparatus.

FIG. 5 is a flow chart of a second example in which a machine tool is operated by a conversational program created by the conversational numerical control apparatus 10. In the second example, the conversational program serving as a machining program is not directly executed, the conversational program is converted into an NC program, and the NC program is performed as a machining program.

The process in the second operation shown in FIG. 5 is almost the same as the process in the first operation shown in FIG. 4, and steps a1 to a20 of the first operation correspond to steps b1 to b20 of the second operation. The first operation shown in FIG. 4 is different from the second operation shown in FIG. 5 in that: a process of outputting learning start commands in steps a6 and a17 of the first operation to a lower-level controller is replaced with a process of adding a learning control start command to an NC program in steps b6 and b17 of the second operation; a process of outputting learning end commands in steps a11 and a19 of the first operation to the lower-level controller is replaced with a process of adding a learning control end command to NC programs in steps b11 and b19 of the second operation; and outputting of machining paths and execution of all the steps in steps a8, a14, and a18 of the first operation are replaced with a process of outputting machining paths in steps b8, b14, and b18 of the second operation as NC program.

An operation process according to the second embodiment is almost the same as the first operation process, and the process will be briefly described.

When a conversational program is not set in a learning control automatic ON/OFF mode (step b1), a normal operation is performed, and the conversational program is converted into an NC program without performing learning control (step b14). When the conversational program is set in the learning control automatic ON/OFF mode, on the other hand, the processor 13 determines whether or not learning control ON/OFF operations are performed for each of steps (step b2). When the ON/OFF operations are set to be performed for each of steps, the initial setting data of the conversational program is loaded, and the first step data of the conversational program is loaded (steps b3 and b4).

The processor 13 determines whether or not the step of converting the conversational program into an NC program is the step to which learning control is applicable (step b5). If learning control is applicable to the step, then a learning control start command (including a learning control correction data transmitting command, in association with the learning control start command) is added (step b6), a path is calculated by the step data, a machining path is obtained and is outputted as an NC program and stored in a memory (steps b7 and b8). On the other hand, if learning control is not applicable to the step, then the process in step b6 is not performed, and only the processes in steps b7 and b8 are performed.

Upon completion of creation of the NC program in the current step, if the previous step is a step in which learning control has been performed, a learning control end command (including a command of fetching correction data from the learning controller, in association with the learning control end command) is added to the NC program, the processes subsequent to step b5 which loads data in the next step are performed. On the basis of the conversational program, a learning control start command and a learning control end command are added to the start and the end of the step in which learning control is performed, so that an NC program is created and stored.

In case where learning control automatic ON/OFF operation is set to the entire program, the program proceeds from step b2 to step b15 to read data of all the step, and the processor 13 determines whether learning control is applicable to all the steps or not (steps b15 and b16). If determined that learning control is not applicable to all the steps, alarm is outputted to inform an operator of the fact. If determined that learning control is applicable to all the steps, on the other hand, the learning control start command is added to the start position of the NC program (step b17), and a machining path in all the steps is converted into an NC program. The NC program is outputted and stored (step b18), a learning control end command is added to the end of the NC program (step b19), and the process is ended.

What is claimed is:

1. A conversational numerical control apparatus which creates correction data on a basis of a position deviation in a same operation pattern and stores the correction data, which has a learning control function of correcting a position deviation in execution of the same operation pattern on the basis of the stored correction data, and which inputs a machining shape and a machining condition in a conversational format to create a conversational program, comprising:
   a determination unit which determines whether or not learning control can be performed with the created conversational program;
   a converting unit which converts said conversational program into an NC program; and
   a command code inserting unit which respectively inserts a command code for start of learning control and a command code for end of learning control in the start and end positions of the NC program which is converted by said converting unit and for which said determination unit determines that the learning control can be performed.

2. The conversational numerical control apparatus according to claim 1, wherein, as an object of the learning control, an entire conversational program is set.

3. The conversational numerical control apparatus according to claim 1, wherein said determination unit determines whether or not learning control can be performed for each of machining steps of the conversational program, and said command code inserting unit respectively inserts the learning control start command code and a learning control end command code in a start and an end of the NC program in a machining step for which said determination unit determines that the learning control can be performed, so that an NC program is created.

4. A conversational numerical control apparatus which creates correction data on a basis of a position deviation in a same operation pattern and stores the correction data, which has a learning control function of correcting a position deviation in execution of the same operation pattern on the basis of the stored correction data, and which inputs a machining shape and a machining condition in a conversational format to create a conversational program, comprising:
   a determination unit which determines whether or not learning control can be performed with the created conversational program;
   a unit which executes the conversational program to output a moving command of a machining path; and
   a command output unit which outputs a learning control start command and a learning control end command to start and end positions of the conversational program for which said determination unit determines that the learning control can be performed.

5. The conversational numerical control apparatus according to claim 4, wherein, as an object of the learning control, an entire conversational program is set.

6. The conversational numerical control apparatus according to claim 4, wherein
   said determination unit determines the created conversational program for each of machining steps,
   the command output unit outputs a learning control start command prior to outputting a moving command of a machining path in a machining step for which said determination unit determines that the learning control can be performed, and outputs a learning control end command after outputting the moving command of the machining path in said machining step.

* * * * *

UNITED STATES PATENT AND TRADEMARK OFFICE
CERTIFICATE OF CORRECTION

PATENT NO. : 7,590,458 B2
APPLICATION NO. : 11/360388
DATED : September 15, 2009
INVENTOR(S) : Takahiko Endo et al.

It is certified that error appears in the above-identified patent and that said Letters Patent is hereby corrected as shown below:

Sheet 5 of 5, (Box No. b5), FIG. 5, Line 3, change "CONVERTION" to --CONVERSION--.

Column 7, Line 1, change "complete" to --completion--.

Column 7, Line 29, change "like) then" to --like), then--.

Signed and Sealed this

Sixteenth Day of March, 2010

David J. Kappos
*Director of the United States Patent and Trademark Office*